United States Patent
Magowan

(10) Patent No.: US 10,125,694 B2
(45) Date of Patent: *Nov. 13, 2018

(54) GEARED FAN WITH INNER COUNTER ROTATING COMPRESSOR

(71) Applicant: UNITED TECHNOLOGIES CORPORATION, Hartford, CT (US)

(72) Inventor: John W. Magowan, Longmeadow, MA (US)

(73) Assignee: United Technologies Corporation, Farmington, CT (US)

( * ) Notice: Subject to any disclaimer, the term of this patent is extended or adjusted under 35 U.S.C. 154(b) by 199 days.

This patent is subject to a terminal disclaimer.

(21) Appl. No.: 14/950,095

(22) Filed: Nov. 24, 2015

(65) Prior Publication Data

US 2016/0076459 A1     Mar. 17, 2016

Related U.S. Application Data

(63) Continuation of application No. 13/556,496, filed on Jul. 24, 2012, now Pat. No. 9,228,535.

(51) Int. Cl.
*F02C 3/107*     (2006.01)
*F02C 7/36*     (2006.01)
(Continued)

(52) U.S. Cl.
CPC ............... *F02C 7/36* (2013.01); *F02C 3/067* (2013.01); *F02C 3/107* (2013.01); *F02K 3/06* (2013.01); *F05D 2260/40311* (2013.01)

(58) Field of Classification Search
CPC ............. F02C 7/36; F02C 3/067; F02K 3/072
See application file for complete search history.

(56) References Cited

U.S. PATENT DOCUMENTS

| 3,132,842 | A | | 5/1964 | Tharp | |
| 3,249,293 | A | * | 5/1966 | Koff | F01D 5/06 416/198 A |

(Continued)

FOREIGN PATENT DOCUMENTS

| GB | 2198791 | | 6/1988 |
| RU | 2316667 | C2 | 2/2008 |
| RU | 2347929 | C2 | 2/2009 |

OTHER PUBLICATIONS

International Search Report dated Oct. 11, 2013 (cited in parent application, from corresponding PCT application).

(Continued)

*Primary Examiner* — Justin Seabe
(74) *Attorney, Agent, or Firm* — Carlson, Gaskey & Olds, P.C.

(57) ABSTRACT

A gas turbine engine has a fan section including a fan hub supporting a plurality of fan blades for rotation relative to a fan case. A shaft is rotatable relative to the fan case about an engine center axis. A geared architecture is driven by the shaft and provides driving output to rotate the fan hub. A compressor is driven by the shaft and is positioned forward of the geared architecture. The compressor includes at least first and second stages with the first stage being positioned forward of the plurality of fan blades and the second stage being positioned aft of the plurality of fan blades. The compressor includes at least one set of vanes that rotate in a first direction about the engine center axis and at least one set of compressor blades that rotate in a second direction about the engine center axis. The second direction is opposite of the first direction.

22 Claims, 1 Drawing Sheet

(51) Int. Cl.
*F02K 3/06* (2006.01)
*F02C 3/067* (2006.01)

(56) References Cited

U.S. PATENT DOCUMENTS

| | | | |
|---|---|---|---|
| 3,404,831 A | 10/1968 | Campbell | |
| 3,611,834 A * | 10/1971 | Dison | F02C 7/36 |
| | | | 475/343 |
| 4,751,816 A | 6/1988 | Perry | |
| 4,772,180 A * | 9/1988 | Walker | B64C 11/306 |
| | | | 416/25 |
| 4,827,712 A | 5/1989 | Coplin | |
| 4,969,325 A | 11/1990 | Adamson et al. | |
| 5,010,729 A | 4/1991 | Adamson et al. | |
| 5,105,618 A | 4/1992 | Lardellier | |
| 7,412,819 B2 | 8/2008 | Bart et al. | |
| 7,716,914 B2 | 5/2010 | Schilling | |
| 7,832,193 B2 | 11/2010 | Orlando et al. | |
| 7,845,157 B2 | 12/2010 | Suciu et al. | |
| 7,874,802 B2 | 1/2011 | Suciu et al. | |
| 7,882,693 B2 | 2/2011 | Schilling | |
| 8,061,968 B2 | 11/2011 | Merry et al. | |
| 8,161,728 B2 | 4/2012 | Kupratis | |
| 8,176,725 B2 | 5/2012 | Norris et al. | |
| 2004/0219024 A1 | 11/2004 | Soupizon et al. | |
| 2008/0098716 A1 | 5/2008 | Orlando et al. | |
| 2009/0074565 A1 | 3/2009 | Suciu et al. | |
| 2009/0155079 A1 * | 6/2009 | Suciu | F01D 5/025 |
| | | | 416/204 R |
| 2009/0162187 A1 * | 6/2009 | Merry | F01D 5/022 |
| | | | 415/60 |
| 2009/0293445 A1 | 12/2009 | Ress, Jr. | |
| 2011/0203293 A1 | 8/2011 | Glahn | |
| 2012/0023899 A1 | 2/2012 | Yasuda | |

OTHER PUBLICATIONS

Supplementary European Search Report for European Application No. 13822304.5 dated Jan. 20, 2016.

* cited by examiner

GEARED FAN WITH INNER COUNTER ROTATING COMPRESSOR

CROSS-REFERENCE TO RELATED APPLICATION

This application is a continuation of U.S. application Ser. No. 13/556,496, filed Jul. 24, 2012.

BACKGROUND OF THE INVENTION

A gas turbine engine includes a fan section, a compressor section, a combustor section, and a turbine section. The fan section drives air along a bypass flowpath while the compressor section drives air along a core flowpath for compression and communication into the combustor section then expansion through the turbine section The engine typically includes a low speed shaft and a high speed shaft mounted for rotation about an engine central longitudinal axis relative to an engine static structure via several bearing systems. The high speed shaft interconnects a high pressure compressor and high pressure turbine. The low speed shaft interconnects a fan, a low pressure compressor, and a low pressure turbine. In one example, the low speed shaft is connected to the fan through a geared architecture to drive the fan at a lower speed than the low speed shaft. The low pressure compressor is positioned aft or rearward of the geared architecture. An example engine configuration having this low pressure compressor position is found in U.S. Pat. No. 8,176,725.

The core airflow is compressed by the low pressure compressor then the high pressure compressor, mixed and burned with fuel in a combustor, then expanded over the high pressure turbine and low pressure turbine. The turbines rotationally drive the respective low speed and high speed shafts in response to the expansion. This typical arrangement provides a geared turbofan of significant length. In certain applications shorter engine lengths are needed.

SUMMARY OF THE INVENTION

In a featured embodiment, a gas turbine engine has a fan section including a fan hub supporting a plurality of fan blades for rotation relative to a fan case. A shaft is rotatable relative to the fan case about an engine center axis. A geared architecture is driven by the shaft and provides driving output to rotate the fan hub. A compressor is driven by the shaft and is positioned forward of the geared architecture. The compressor includes at least first and second stages with the first stage being positioned forward of the plurality of fan blades and the second stage being positioned aft of the plurality of fan blades. The compressor includes at least one set of vanes that rotate in a first direction about the engine center axis and at least one set of compressor blades that rotate in a second direction about the engine center axis. The second direction is opposite of the first direction.

In another embodiment according to the previous embodiment, the first stage includes at least one set of vanes and at least one set of compressor blades. The second stage includes a second set of vanes and a second set of compressor blades. The compressor includes a rotor that is directly driven by the shaft and that drives the second set of compressor blades.

In another embodiment according to any of the previous embodiments, the shaft directly drives the first set of compressor blades.

In another embodiment according to any of the previous embodiments, the compressor includes a third stage positioned aft of the second stage. The third stage includes a third set of compressor blades driven by the rotor. The at least one set of vanes and the second set of vanes are fixed to the fan hub.

In another embodiment according to any of the previous embodiments, at least one inter-shaft bearing is mounted directly between the shaft and the at least one set of vanes.

In another embodiment according to any of the previous embodiments, at least one inter-shaft bearing is radially aligned with the plurality of fan blades.

In another embodiment according to any of the previous embodiments, a static structure and a first fan bearing are positioned between the fan hub and the static structure. The first fan bearing is radially outward of, and overlapping with, the second stage.

In another embodiment according to any of the previous embodiments, a second fan bearing is positioned between the fan hub and the static structure. The second fan bearing is radially outward of, and overlapping with, the geared architecture.

In another embodiment according to any of the previous embodiments, the geared architecture is comprised of a sun gear that is driven by the shaft, a plurality of gears supported by a carrier fixed to a static structure and in meshing engagement with the sun gear, and an outer annular gear in meshing engagement with the plurality of gears.

In another embodiment according to any of the previous embodiments, the fan section includes a plurality of static vanes extending between the fan case and a static structure. The static vanes are radially outward of, and overlapping with, the geared architecture.

In another embodiment according to any of the previous embodiments, a static structure is included. A first fan bearing is positioned between the fan hub and the static structure. The first fan bearing is radially outward of, and overlapping with, the second stage. A second fan bearing is positioned between the fan hub and the static structure. The second fan bearing is radially outward of, and overlapping with, the geared architecture.

In another embodiment according to any of the previous embodiments, at least one inter-shaft bearing is mounted directly between the shaft and the at least one set of vanes.

In another embodiment according to any of the previous embodiments, at least one inter-shaft bearing is radially inward of, and overlapping with, the plurality of fan blades.

In another featured embodiment, a gas turbine engine has a fan section including a fan outer case, a static structure positioned radially inward of the fan outer case, and a fan hub supporting a plurality of fan blades for rotation relative to the static structure. At least one fan support bearing supports the fan hub for rotation relative to the static structure. A shaft is rotatable relative to the static structure about an engine center axis. A geared architecture is driven by the shaft and provides driving output to rotate the fan hub. A low pressure compressor is driven directly by the shaft and positioned forward of the geared architecture and radially inward of the fan blades. The compressor includes at least first and second stages with the first stage being positioned forward of the plurality of fan blades and the second stage being positioned aft of the plurality of fan blades. The compressor includes at least one set of vanes that rotate in a first direction about the engine center axis and at least one set of compressor blades that rotate in a second direction about the engine center axis. The second direction is opposite of the first direction.

In another embodiment according to the previous embodiment, the geared architecture is comprised of a sun gear that is driven by the shaft, a plurality of gears supported by a carrier fixed to the static structure and in meshing engagement with the sun gear, and an outer annular gear in meshing engagement with the plurality of gears to drive the fan hub.

In another embodiment according to any of the previous embodiments, the first stage includes at least one set of vanes and at least one set of compressor blades. The second stage includes a second set of vanes and a second set of compressor blades. The compressor includes a rotor that drives the second set of compressor blades. The shaft directly drives the rotor and directly drives the first set of compressor blades.

In another embodiment according to any of the previous embodiments, at least one fan support bearing comprises at least a first fan bearing positioned between the fan hub and the static structure, the first fan bearing being radially outward of, and overlapping with, the second stage, and a second fan bearing positioned between the fan hub and the static structure. The second fan bearing is radially outward of, and overlapping with, the geared architecture.

In another embodiment according to any of the previous embodiments, at least one inter-shaft bearing is mounted directly between the shaft and the at least one set of vanes. At least one inter-shaft bearing is radially inward of, and overlapping with, the plurality of fan blades.

In another embodiment according to any of the previous embodiments, the compressor includes a third stage positioned aft of the second stage. The third stage includes a third set of compressor blades driven by the rotor. The compressor includes a rotor that drives the second and third sets of compressor blades. At least one set of vanes and the second set of vanes are fixed to the fan hub.

In another embodiment according to any of the previous embodiments, the shaft directly drives the first set of compressor blades separate from the rotor.

These and other features of this application will be best understood from the following specification and drawings, the following of which is a brief description.

DETAILED DESCRIPTION

Figure 1:
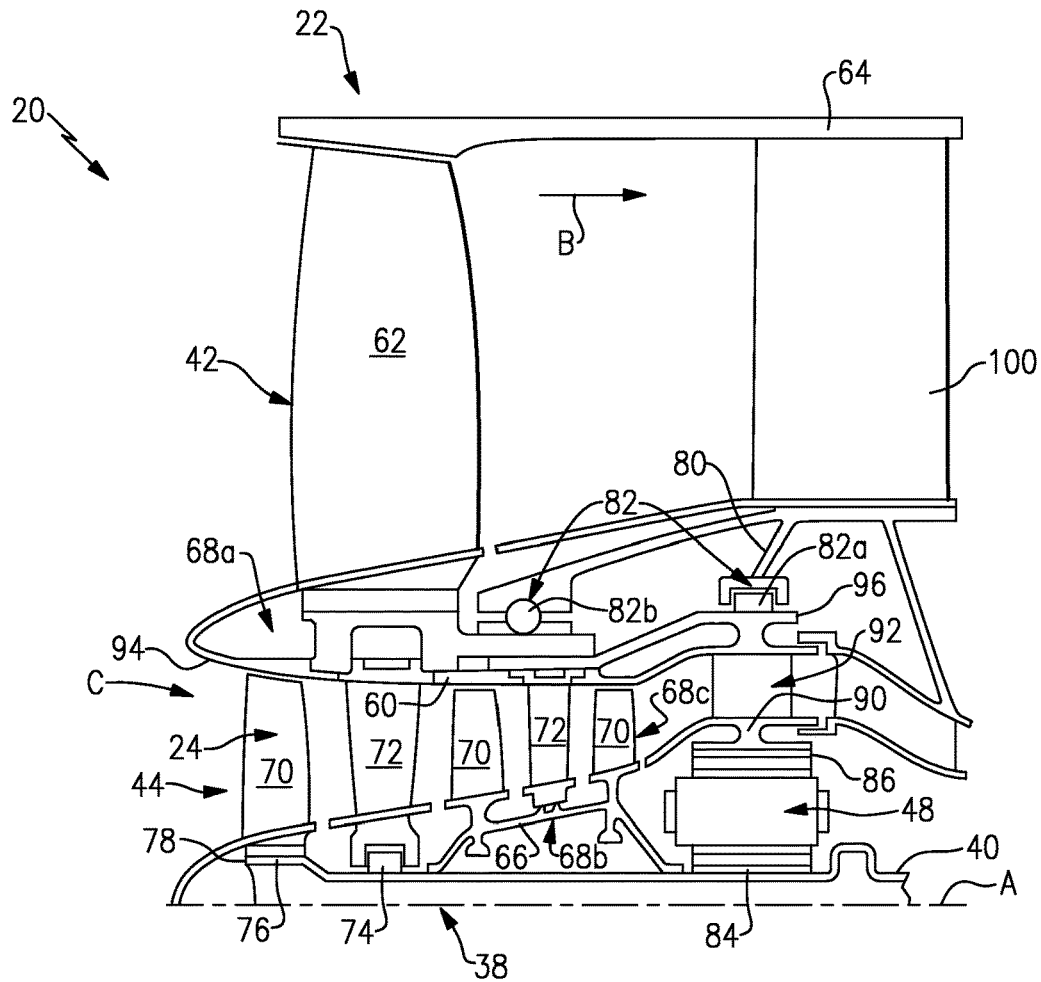
FIG. 1 schematically illustrates a fan section and low pressure compressor of a gas turbine engine.
Figure 2:
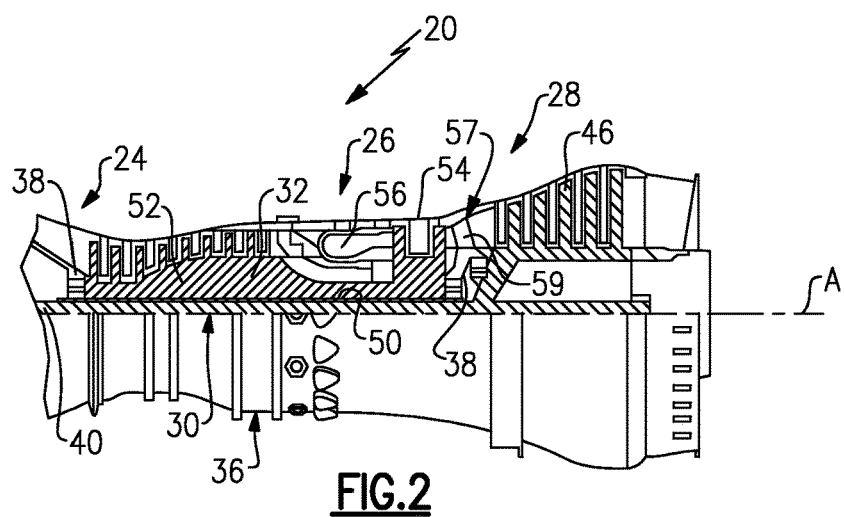
FIG. 2 schematically illustrates a high pressure compressor, combustor and turbine section of the gas turbine engine.

FIGS. 1-2 schematically illustrate a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath B while the compressor section 24 drives air along a core flowpath C for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a low pressure (or first) compressor section 44 and a low pressure (or first) turbine section 46. The fan section 22 includes a fan 42 that is driven by the inner shaft 40 through a geared architecture 48. The high speed spool 32 includes an outer shaft 50 that interconnects a high pressure (or second) compressor section 52 and high pressure (or second) turbine section 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 supports one or more bearing systems 38 in the turbine section 28. The inner shaft 40 and the outer shaft 50 are concentric and rotate via bearing systems 38 about the engine central longitudinal axis A, which is collinear with their longitudinal axes. As used herein, a "high pressure" compressor or turbine experiences a higher pressure than a corresponding "low pressure" compressor or turbine.

The core airflow C is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path. The turbines 46, 54 rotationally drive the respective low speed spool 30 and high speed spool 32 in response to the expansion.

The engine 20 in one example is a high-bypass geared aircraft engine. In a further example, the engine 20 bypass ratio is greater than about six (6), with an example embodiment being greater than ten (10), the geared architecture 48 is an epicyclic gear train, such as a star gear system or other gear system, with a gear reduction ratio of greater than about 2.3 and the low pressure turbine 46 has a pressure ratio that is greater than about 5. In one disclosed embodiment, the engine 20 bypass ratio is greater than about ten (10:1), the fan diameter is significantly larger than that of the low pressure compressor 44, and the low pressure turbine 46 has a pressure ratio that is greater than about 5:1. Low pressure turbine 46 pressure ratio is pressure measured prior to inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned per hour divided by lbf of thrust the engine produces at that minimum point. "Fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tambient deg R})/518.7)^{\wedge}0.5]$. The "Low corrected fan tip speed" as disclosed herein according to one non-limiting embodiment is less than about 1150 ft/second.

As shown in FIG. 1, the fan section 22 includes a fan hub 60 supporting a plurality of fan blades 62 for rotation relative to a fan case 64. The geared architecture 48 is driven by the inner shaft 40 and provides driving output to rotate the fan hub 60 such that the fan hub 60 rotates at a slower speed than the inner shaft 40. In one example, the gear ratio between the shaft and the fan is approximately 3:1; however, other ratios could also be used. The low pressure compressor 44 has a rotor 66 that is positioned forward of the geared architecture 48. The rotor 66 receives driving input from the inner shaft 40.

In one example, the inner shaft 40 directly drives the rotor 66, i.e. the rotor 66 is not driven by the shaft via the geared architecture. As such, the rotor 66 of the low pressure compressor 44 is divorced from the fan 42.

In the example shown in FIG. 1, the low pressure compressor 44 is comprised of a plurality of stages 68a, 68b, 68c with each stage of the first 68a and second 68b stages including a set of blades 70 and a set of vanes 72 positioned aft of an associated set of blades 70. In this example, the third stage 68c only includes a set of blades; however, a third set of vanes 72 could also be utilized with the third stage 68c if needed. The set of blades 70 of the first stage 68a are coupled directly to the inner shaft 40. The sets of blades 70 of the second 68b and third 68c stages are fixed for rotation with the rotor 66. In this example, the low pressure compressor 44 has three stages; however, it should be understood that the low pressure compressor 44 could have fewer or additional stages than that which is shown.

The blades 70 are fixed for rotation with the inner shaft 40 and the vanes 72 are fixed to the fan hub 60. As such, the vanes 72 rotate with the fan hub 60 in one direction while the rotor 66 and blades 70 rotate with the inner shaft 40 in opposite direction. Further, as the fan hub 60 is driven through the geared architecture 48, the vanes 72 and fan hub 60 rotate at a slower speed than the inner shaft 40, rotor 66, and blades 70.

The bearing system 38 includes at least one inter-shaft bearing 74 that is mounted between the inner shaft 40 and one set of the vanes 72 to provide additional support for the vanes 72 as the shaft 40 and vanes 72 rotate relative to each other. In one example, the inter-shaft bearing 74 supports the vanes 72 of the first stage 68a, i.e. the stage that is foremost located within the engine 20. In the example shown, the inter-shaft bearing 74 is radially aligned with the fan blades 62.

The inner shaft 40 has an increased diameter portion 76 at a forward end 78 of the inner shaft 40. The set of blades 70 for the first stage 68a are directly mounted for rotation with the inner shaft 40 at the increased diameter portion 76. The inter-shaft bearing 74 is positioned aft of these blades 70. The rotor 66 that supports the blades 70 for the second 68b and third 68c stages is positioned aft of the inter-shaft bearing 74.

The engine 20 includes a static structure 80 and one or more fan support bearings 82 that support the fan hub 60 for rotation relative to the static structure 80. In one example, the geared architecture 48 is comprised of a sun gear 84 that is driven by the inner shaft 40 and a plurality of star gears 86 that are supported by a carrier that is fixed to the static structure 80. The star gears 86 are in meshing engagement with the sun gear 84 and an outer annular gear 90 is in meshing engagement with the star gears 86. As such, the inner shaft 40 directly drives the sun gear 84 and the outer annular gear 90 provides driving output to the fan hub 60.

In one example, the fan hub 60 includes a plurality of fan drive struts 92. The fan hub 60 includes a forward end 94 and an aft end 96. The fan blades 62 are fixed to the forward end 94 and extend radially outwardly toward the fan case 64. The fan drive struts 92 are fixed to the aft end 96 and extend radially inwardly toward the engine center axis A. The outer annular gear 90 provides direct driving input to the fan drive struts 92.

In one example, the at least one fan support bearing 82 comprises at least a first bearing 82a positioned radially between the fan drive struts 92 and the static structure 80, and a second bearing 82b positioned radially between the fan hub 60 and the static structure 80. The second bearing 82b is positioned forward of the first bearing 82a. In one example, the second bearing 82b is radially aligned with the second stage 68b of the low pressure compressor 44. Further, the second bearing 82b is positioned axially between the inter-shaft bearing 74 and the first bearing 82a. In one example, the first bearing 82a comprises a roller bearing and the second bearing 82b comprises a ball bearing.

The fan section 22 also includes a plurality of static vanes 100 extending between the fan case 64 and the static structure 80. The static vanes 100 are positioned immediately aft of the fan blades 62.

By locating the low pressure compressor 44 forward of the geared architecture 48, the overall length of the geared turbofan engine can be reduced. The low pressure compressor rotor 66 is not geared and thus rotates substantially faster and in the opposite direction of the geared fan 42. As such, the core (inner) flow path C includes a forward located, counter rotating low pressure compressor 44. The low pressure compressor vanes 72 are connected to the fan hub 60 and thus rotate with the geared fan 42 in the opposite direction in which the fan blades 70 rotate. The fan 42 is driven by the struts 92 that comprise part of the low pressure compressor flow path. As a result of the counter-rotating low pressure compressor blades 70 and vanes 72, the amount of compression per stage (blade/vane) is greater than conventional engines in which the vanes are stationary. Further, as a result of the increase in compression per stage, fewer stages are needed in comparison to conventional engines to achieve the same amount of compression. Finally, as a result of the fewer stages needed, the number of engine parts is correspondingly reduced, which enables the engine to be lighter and shorter in overall axial length, as compared to conventional engines.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gas turbine engine comprising:
   a fan section including a fan hub supporting a plurality of fan blades for rotation relative to a fan case;
   a shaft rotatable relative to the fan case about an engine center axis;
   a geared architecture driven by the shaft and providing driving output to rotate the fan hub; and
   a compressor driven by the shaft and positioned forward of the geared architecture, the compressor including at least a first stage and a second stage immediately downstream of the first stage, and with each of the first and second stages including a set of blades and a set of vanes, the blades of the first stage being positioned to extend forward of the plurality of fan blades and the blades of the second stage being positioned to extend aft of the plurality of fan blades, and wherein the vanes of the first and second stages rotate in a first direction about the engine center axis and the blades of the first and second stages rotate in a second direction about the engine center axis, wherein the second direction is opposite of the first direction.

2. The gas turbine engine according to claim 1 wherein the compressor includes a rotor that is directly driven by the shaft and that drives the blades of the second stage.

3. The gas turbine engine according to claim 2 wherein the shaft directly drives the blades of the first stage.

4. The gas turbine engine according to claim 3 wherein the compressor includes a third stage positioned immediately aft of the second stage, the third stage including a third set of compressor blades driven by the rotor, and wherein the vanes of the first and second stages are fixed to the fan hub.

5. The gas turbine engine according to claim 2 including at least one inter-shaft bearing mounted directly between the shaft and the vanes of the first stage.

6. The gas turbine engine according to claim 5 wherein the at least one inter-shaft bearing is radially aligned with the plurality of fan blades.

7. The gas turbine engine according to claim 5 including a static structure and a first fan bearing positioned between the fan hub and the static structure, wherein the first fan bearing is radially outward of, and overlapping with, the second stage.

8. The gas turbine engine according to claim 7 including a second fan bearing positioned between the fan hub and the static structure, wherein the second fan bearing is radially outward of, and overlapping with, the geared architecture.

9. The gas turbine engine according to claim 1 wherein the geared architecture is comprised of a sun gear that is driven by the shaft, a plurality of gears supported by a carrier fixed to a static structure and in meshing engagement with the sun gear, and an outer annular gear in meshing engagement with the plurality of gears.

10. The gas turbine engine according to claim 1 wherein the fan section includes a plurality of static vanes extending between the fan case and a static structure, and wherein the static vanes are radially outward of, and overlapping with, the geared architecture.

11. The gas turbine engine according to claim 1 including a static structure,
a first fan bearing positioned between the fan hub and the static structure, wherein the first fan bearing is radially outward of, and overlapping with, the second stage, and
a second fan bearing positioned between the fan hub and the static structure, wherein the second fan bearing is radially outward of, and overlapping with, the geared architecture.

12. The gas turbine engine according to claim 11 including at least one inter-shaft bearing mounted directly between the shaft and the vanes of the first stage.

13. The gas turbine engine according to claim 12 wherein the at least one inter-shaft bearing is radially inward of, and overlapping with, the plurality of fan blades.

14. The gas turbine engine according to claim 2 wherein the vanes of the second stage are aft of the plurality of fan blades, and wherein the blades of the second stage and the vanes of the first stage are in an at least partially overlapping relationship with the plurality of fan blades.

15. A gas turbine engine comprising:
a fan section including a fan outer case, a static structure positioned radially inward of the fan outer case, and a fan hub supporting a plurality of fan blades for rotation relative to the static structure;
at least one fan support bearing to support the fan hub for rotation relative to the static structure;
a shaft rotatable relative to the static structure about an engine center axis;
a geared architecture driven by the shaft and providing driving output to rotate the fan hub; and
a low pressure compressor driven directly by the shaft and positioned forward of the geared architecture and radially inward of the fan blades, the compressor including at least a first stage and a second immediately downstream of the first stage, and with each of the first and second stage including a set of blades and a set of vanes, the blades of the first stage being positioned to extend forward of the plurality of fan blades and the blades of the second stage being positioned to extend aft of the plurality of fan blades, and wherein the vanes of the first and second stages rotate in a first direction about the engine center axis and the blades of the first and second stages rotate in a second direction about the engine center axis, wherein the second direction is opposite of the first direction.

16. The gas turbine engine according to claim 15 wherein the geared architecture is comprised of a sun gear that is driven by the shaft, a plurality of gears supported by a carrier fixed to the static structure and in meshing engagement with the sun gear, and an outer annular gear in meshing engagement with the plurality of gears to drive the fan hub.

17. The gas turbine engine according to claim 15 wherein the compressor includes a rotor that drives the blades of the second stage, and wherein the shaft directly drives the rotor and directly drives the blades of the first stage.

18. The gas turbine engine according to claim 15 wherein the at least one fan support bearing comprises at least:
a first fan bearing positioned between the fan hub and the static structure, wherein the first fan bearing is radially outward of, and overlapping with, the second stage, and
a second fan bearing positioned between the fan hub and the static structure, wherein the second fan bearing is radially outward of, and overlapping with, the geared architecture.

19. The gas turbine engine according to claim 18 including at least one inter-shaft bearing mounted directly between the shaft and the vanes of the first stage, and wherein the at least one inter-shaft bearing is radially inward of, and overlapping with, the plurality of fan blades.

20. The gas turbine engine according to claim 17 wherein the compressor includes a third stage positioned immediately aft of the second stage, the third stage including a third set of compressor blades driven by the rotor, and wherein the compressor includes a rotor that drives the third set of compressor blades and the blades of the second stage, and wherein the vanes of the first and second stages are fixed to the fan hub.

21. The gas turbine engine according to claim 20 wherein the shaft directly drives the blades of the first stage separate from the rotor.

22. The gas turbine engine according to claim 17 wherein the vanes of the second stage are aft of the plurality of fan blades, and wherein the blades of the second stage and the vanes of the first stage are in an at least partially overlapping relationship with the plurality of fan blades.

* * * * *